United States Patent [19]
Bockmiller

[11] Patent Number: 5,371,981
[45] Date of Patent: Dec. 13, 1994

[54] WALL ASSEMBLY SUPPORT APPARATUS

[76] Inventor: Douglas F. Bockmiller, 5601 Balmoral Dr., Oakland, Calif. 94619

[21] Appl. No.: 202,472

[22] Filed: Feb. 28, 1994

Related U.S. Application Data

[60] Division of Ser. No. 94,868, Jul. 22, 1993, Pat. No. 5,307,596, which is a continuation of Ser. No. 846,608, Mar. 5, 1992, abandoned.

[51] Int. Cl.$^5$ .................... E04B 2/88; E04B 2/78
[52] U.S. Cl. .................... 52/36.5; 52/36.4; 52/235; 52/241; 52/775
[58] Field of Search ............ 52/36.4, 36.5, 36.6, 52/235, 241, 775

[56] References Cited

U.S. PATENT DOCUMENTS

| | | | |
|---|---|---|---|
| 4,506,484 | 3/1985 | Bartlett et al. | 52/476 |
| 4,560,130 | 12/1985 | Schwartz | 52/36.4 |
| 4,570,390 | 2/1986 | Wendt | 52/36.4 |
| 4,984,400 | 1/1991 | Bockmiller | 52/241 |
| 5,070,667 | 12/1991 | Schulte | 52/241 |
| 5,307,596 | 5/1994 | Bockmiller | 52/36.5 |

Primary Examiner—Carl D. Friedman
Assistant Examiner—Christopher Todd Kent
Attorney, Agent, or Firm—Thomas R. Lampe

[57] ABSTRACT

Support apparatus including a framing member for supporting at least one panel of a wall assembly and for supporting a structural member projecting outwardly from the framing member and the panel.

1 Claim, 5 Drawing Sheets

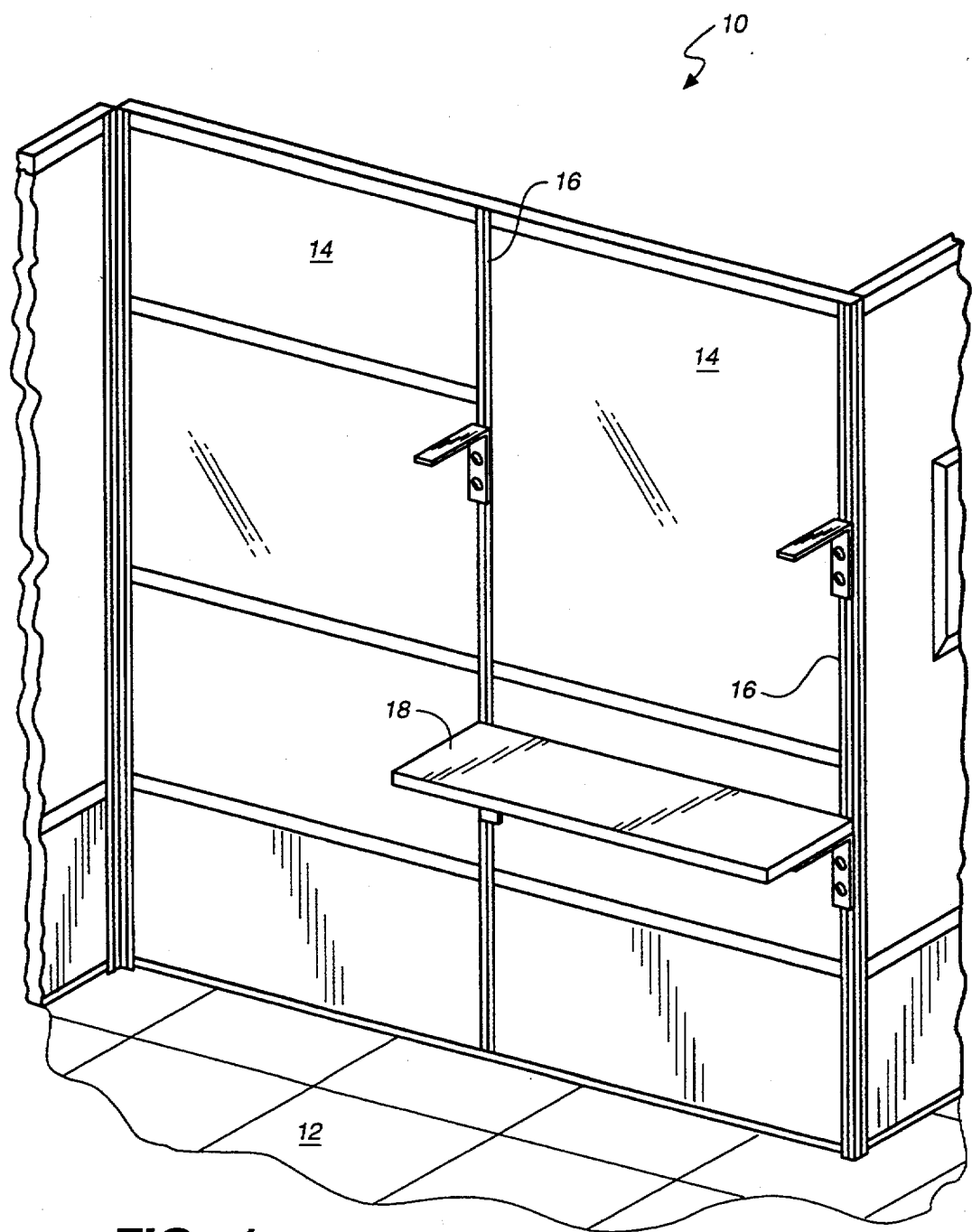
FIG._1

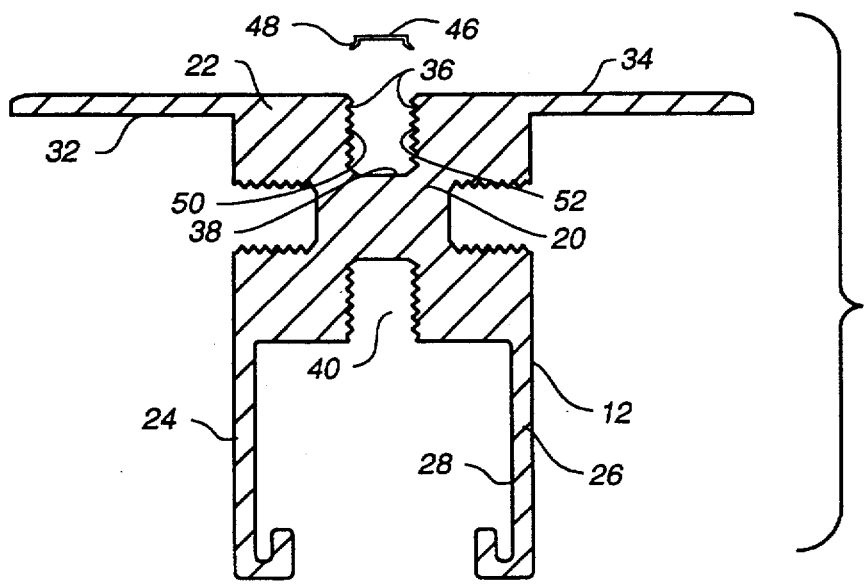
FIG._2
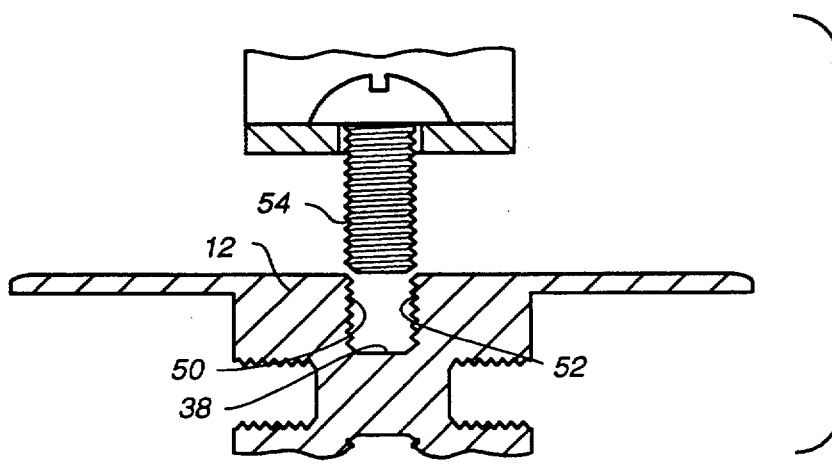
FIG._2A
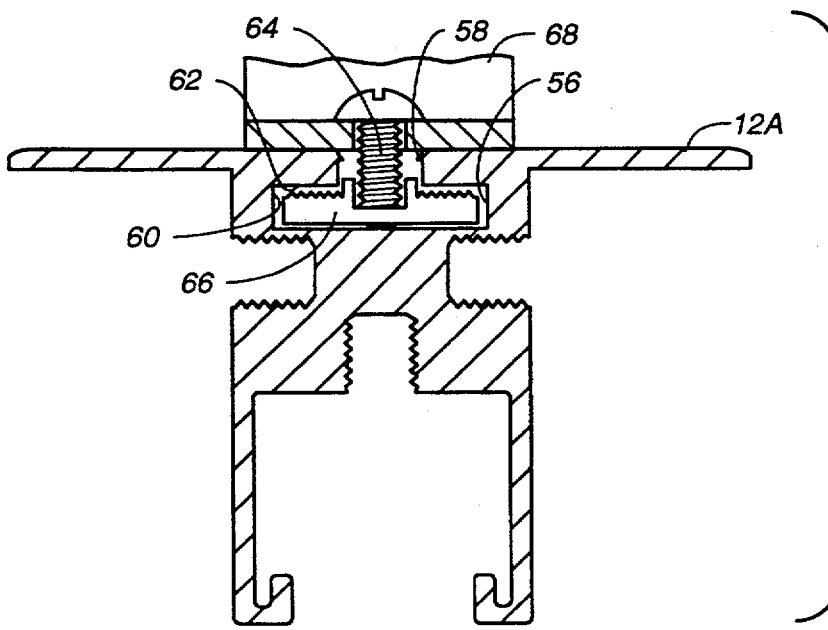
FIG._3

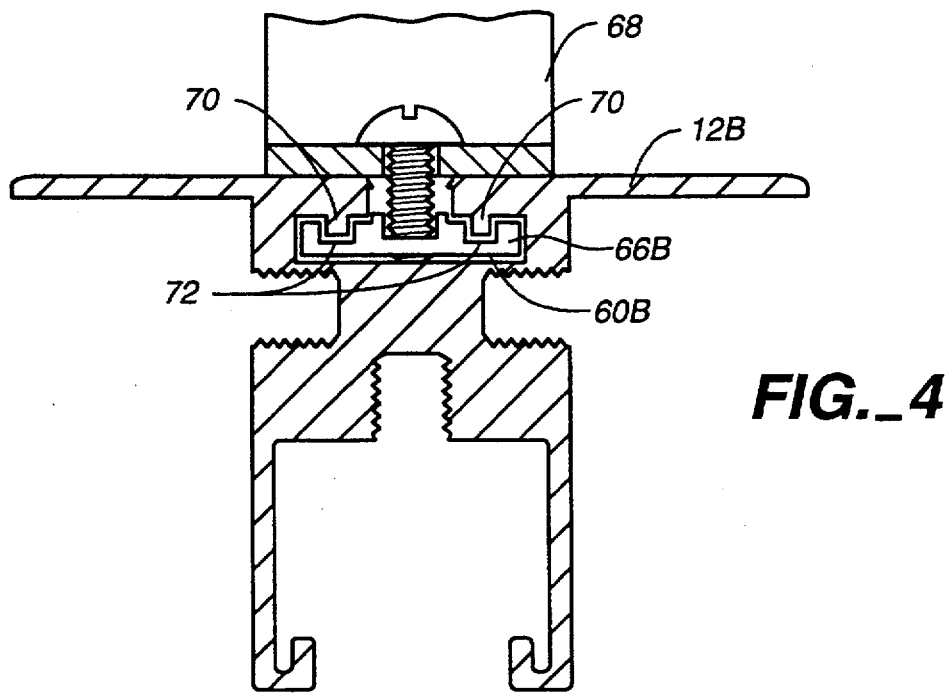
FIG._4
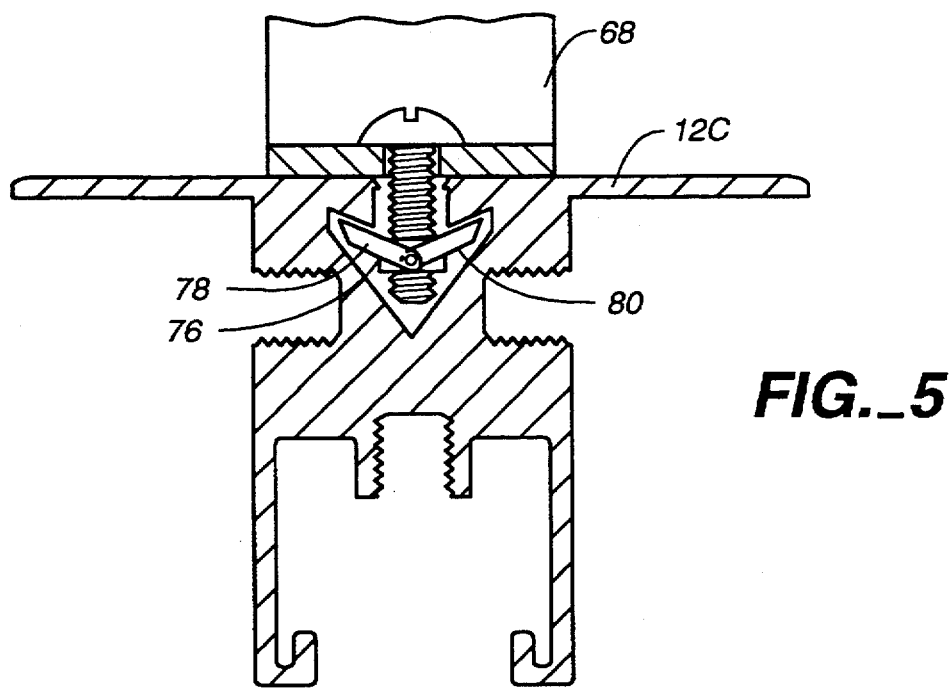
FIG._5

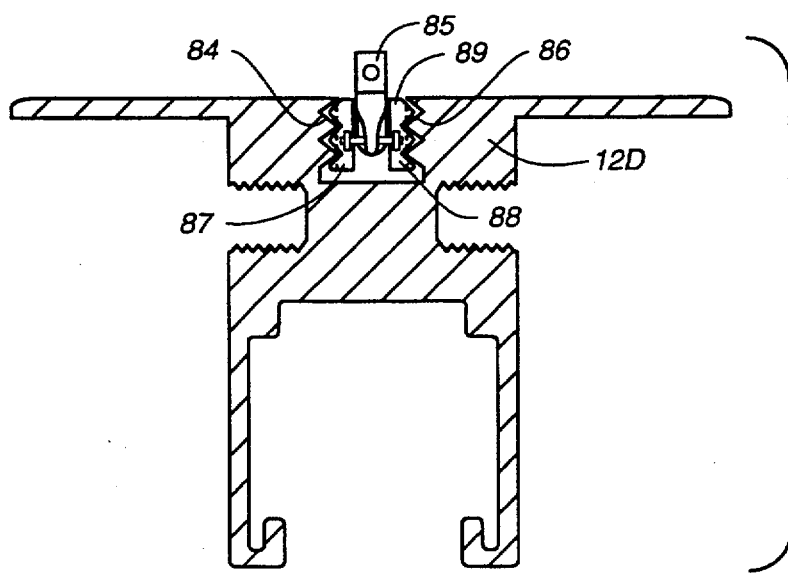
FIG._6
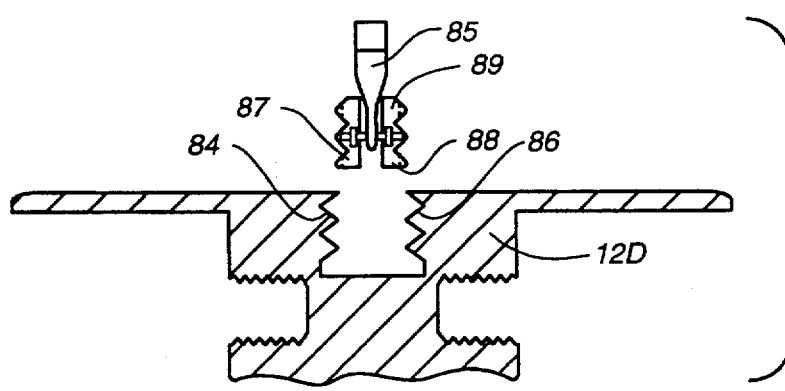
FIG._6A
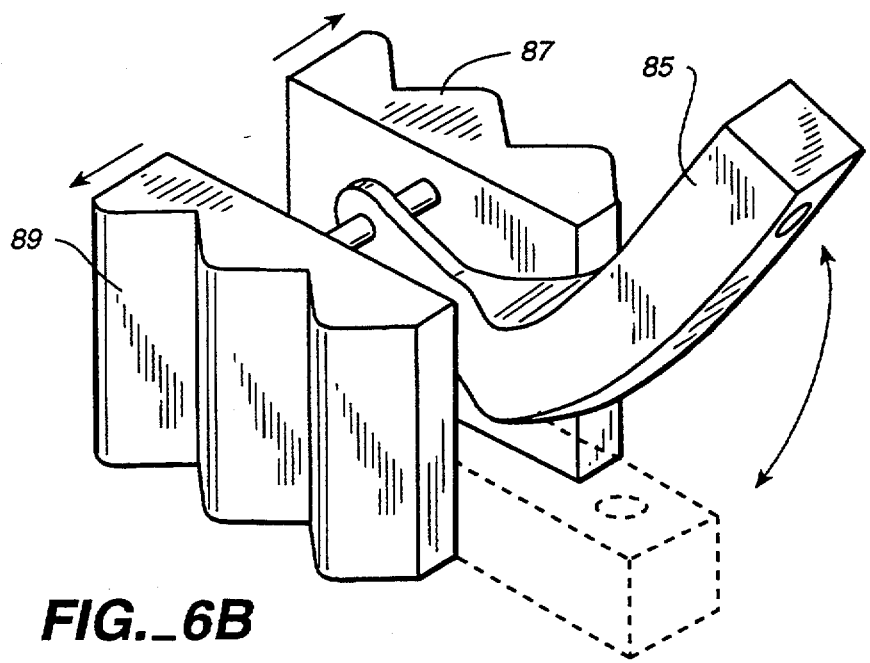
FIG._6B

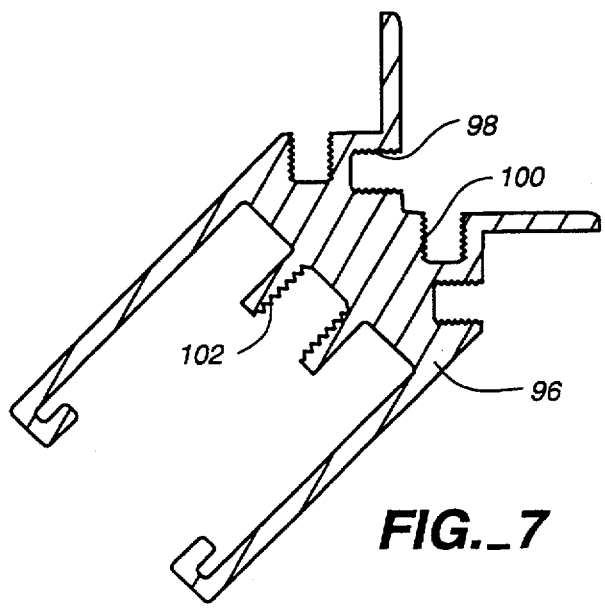
FIG._7
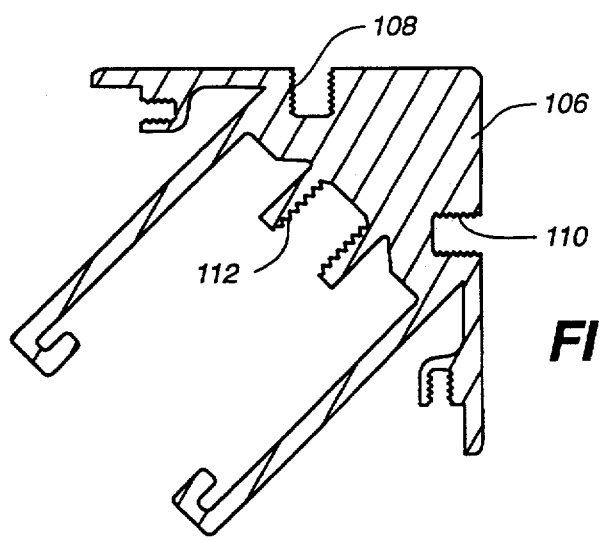
FIG._8
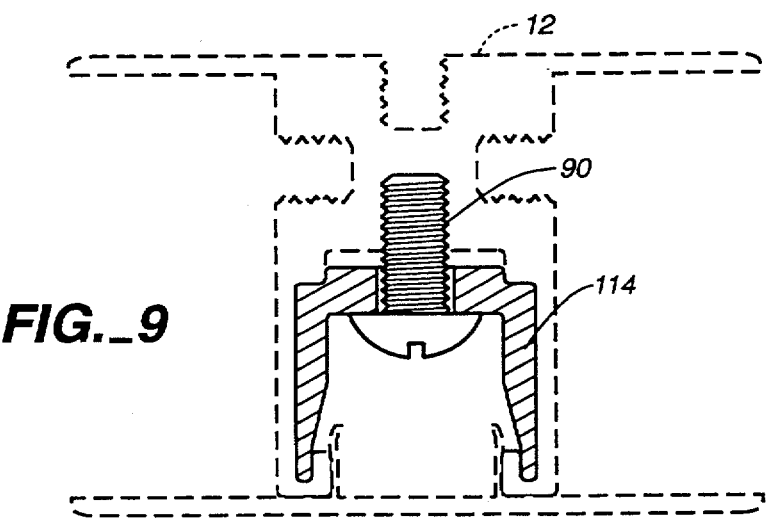
FIG._9

WALL ASSEMBLY SUPPORT APPARATUS

This is a division of application Ser. No. 08/094,868 filed Jul. 22, 1993, now U.S. Pat. No. 5,307,596 which is a continuation of application Ser. No. 07/846,608, filed. Mar. 5, 1992 and now abandoned.

TECHNICAL FIELD

This invention relates to a channel wall system of the type employed, for example, in clean rooms. More particularly, the invention pertains to support apparatus including a framing member for supporting at least one panel of a wall assembly and for supporting a structural member projecting outwardly from the framing member and the panel.

BACKGROUND ART

U.S. Pat. No. 4,984,400, issued Jan. 15, 1991, is directed to a clean room channel wall system. The system includes extruded framing members which are operable to join wall and other panels of the wall system and support them.

While the wall system disclosed in U.S. Pat. No. 4,984,400 has met with widespread commercial success, the system as disclosed has a limitation. Namely, it does not provide or allow for support of structural members, such as shelves, tabletops, seats and the like, from the "clean side" of the wall.

DISCLOSURE OF INVENTION

The wall system of the present invention incorporates support apparatus including a framing member for supporting at least one panel of a wall assembly and for supporting a structural member projecting outwardly from the framing member and the panel. The support apparatus is of relatively simple, inexpensive construction, and provides a means whereby the wall system may be quickly and efficiently assembled and disassembled. The framing members utilized in the support apparatus are of a construction which provide for the ready attachment and detachment of structural members, such as shelving, seating and tabletops, relative thereto while maintaining a clean environment.

The framing member of the present invention includes an elongated body having a front panel and pair of legs opposed to one another and having distal ends spaced from the front panel and defining a channel.

At least one elongated panel support flange is integrally connected to the elongated body and contiguous with the front panel. The elongated body defines an elongated opening in the front panel and further defines an elongated recess in at least partial registry with the elongated opening and communicating with the elongated opening.

The elongated opening and the elongated recess extend a substantial length along the elongated body and are for receiving and accommodating attachment means, whereby the structural member may be attached to the framing member at a preselected location of a plurality of locations along the elongated body.

The attachment means is a mechanical fastener selectively attachable to the elongated body and selectively detachable from the elongated body. A number of elongated recess configurations and mechanical fasteners for operative association therewith are disclosed herein.

Other features, advantages, and objects of the present invention will become apparent with reference to the following description and accompanying drawings.

BRIEF DESCRIPTION OF DRAWINGS

FIG. 1 is a pictorial view of a clean room wall system incorporating the present invention;

FIG. 2 is an enlarged, cross-sectional view of a framing member constructed in accordance with the teachings of the present invention;

FIG. 2A is a greatly enlarged, fragmentary view of a portion of the framing member in FIG. 2 and a mechanical fastener to be operatively associated therewith;

FIG. 3 is an enlarged, cross-sectional view of an alternate form of framing member and mechanical fastener;

FIG. 4 is an enlarged cross-sectional view of yet another form of framing member and mechanical fastener;

FIG. 5 is an enlarged cross-sectional view of still another form of framing member and mechanical fastener;

FIG. 6 is an enlarged, cross-sectional view of another embodiment of framing member and mechanical fastener;

FIG. 6A is an enlarged, fragmentary, cross-sectional view of the FIG. 6 embodiment;

FIG. 6B is a greatly enlarged, perspective view of the FIG. 6 embodiment;

FIG. 7 is a cross-sectional view of an inside corner framing member incorporating the teachings of the present invention;

FIG. 8 is a cross-sectional view of an outside corner framing member incorporating the teachings of the present invention; and FIG. 9 is a cross-sectional view of a fitting which may be incorporated with the framing member shown in FIG. 2.

MODES FOR CARRYING OUT THE INVENTION

Referring now to FIG. 1, a wall system 10 utilizing the apparatus of the present invention is illustrated. The wall system extends upwardly from a floor 12 and includes a plurality of interconnected framing members supporting and holding wall assembly panels such as wall panels 14. U.S. Pat. No. 4,984,400, noted above, may be referred to for specific operational details of a wall system of this general type.

Utilizing the teachings of the present invention, the wall system may be utilized to support structural members such as shelf 18 therefrom.

FIGS. 2, 2A disclose a preferred embodiment of framing member 12. Framing member 12 is generally of the type disclosed in U.S. Pat. No. 4,984,400 and its construction and operation need not be described in detail. Suffice it to say that framing member 12 includes an elongated body 20 having a front body panel 22. A pair of legs 24, 26 are also incorporated in the elongated body. Legs 24, 26 are opposed to one another, incorporate distal ends spaced from the front body panel, and define a channel 28.

A pair of elongated panel support flanges 32, 34 are integrally connected to the elongated body and contiguous with the front body panel.

The elongated body 20 defines an elongated opening 36 in the front body panel and further defines an elongated recess 38 leading inwardly from elongated opening 36.

The elongated opening 36 and the elongated recess 38 extend along the length of the elongated body 20.

The opening and recess are for the purpose of receiving and accommodating attachment means whereby a structural member, such as shelf 18, may be attached to the framing member at a preselected location of a plurality of locations along the elongated body, and accept a snap-on cover to ensure cleanliness.

Framing member 12 also defines a second elongated recess 40 communicating with channel 28, but the second elongated recess 40 is not utilized for the support of shelving 18 or other structural members from the front of the wall. Recess 40 may be utilized for any other desired purpose such as attachment of auxiliary wall system fittings or fixtures thereto. For example, FIG. 9 shows the framing member 12 employed in conjunction with a fitting 114 disposed within the framing member channel. This is merely representative of the types of fittings which may be secured to framing member 12 by a mechanical fastener when utilizing second elongated recess 40.

Elongated recess 38 of framing member 12 is defined by spaced, grooved, elongated recess side walls 50, 52. The grooved side walls are adapted to be engaged by a threaded mechanical fastener such as screw 54, after the cover plate 46 has been removed. It will be appreciated that the screw or other threaded fastener may be screwed in engagement with the grooves of the recess 30 side walls at any desired location along the length of the elongated recess 38 and may be utilized with any suitable bracket or other conventional mechanical contrivance to secure a shelf or other structural member in place.

It may readily be seen that the grooves of the recess side walls 50, 52 of the framing member 12 forms inwardly projecting lips or projections in the area of elongated opening 36. The grooves are utilized to releasably secure an elongated cover plate thereto. One such cover plate is disclosed in FIG. 2 and identified by reference numeral 46. Resilient members 48 project therefrom for selective attachment and detachment from the framing member. This provides and ensures containment of particulates trapped in the recess.

FIG. 3 shows an alternative embodiment framing member, framing member 12A, wherein an elongated recess 56 does not have grooved side walls but rather is comprised of a first, relatively restricted, elongated recess portion 58 and a second, larger, elongated recess portion 60 whereby engagement surfaces 62 are formed.

A screw 64 is positioned in the recess and has an elongated nut element 66 threadedly engaged therewith. The elongated shape of the nut element 66 allows same to be inserted in the recess portion 58 and turned to bring it into alignment with the engagement surfaces 62 (the portion shown in FIG. 3). Turning of the screw tightens the nut into firm engagement with such engagement surfaces. It should be noted that the outer ends of the nut element are knurled to "bite" into the framing member 12A to secure the mechanical fastener into position. In the arrangement illustrated, a bracket 68 is secured to the framing member 12A by the screw. Projections are formed at the top of the recess to promote securement of a cover plate thereto when framing member 12A does not receive a fastener.

Yet another embodiment of the apparatus is shown in FIG. 4 wherein framing member 12B defines projections 70 extending into recess portion 60B which are received in indents 72 of a nut element 66B.

In the arrangement disclosed in FIG. 5, a framing member 12C defines an elongated recess having a generally arrow-shaped cross-sectional configuration. In this instance the nut element 76 includes two relatively moveable nut element segments 78, 80 which allow insertion of the nut element into the restricted outer recess portion and expansion thereof when positioned in the lower, larger recess portion.

In the FIG. 6, 6A, 6B embodiment, the framing member 12D has recess side walls 84, 86 having grooves somewhat larger than those employed in framing member 12. In this embodiment, the mechanical fastener takes the form of an expansible member 88 which is tightened into position by actuator member 85. When in the position illustrated in FIG. 6, actuator member 90 also serves to support a structural member such as a shelf. Actuator member 85 is generally wedge-shaped and pivotally mounted on a pin extending between the two relatively movable components 87, 89 of member 88. Movement of the actuator member from the solid line position of FIG. 6B to the dash line position will cam the components 87, 89 apart and into firm engagement with the side walls 84, 86.

FIG. 7 illustrates a framing member 96 which may be employed to support two adjacent wall panels (not shown) at the corner of the wall system. Such a framing member is similar to the inside corner framing member disclosed in U.S. Pat. No. 4,984,400 except that it employs two outwardly directed elongated recesses 98, 100 engageable by suitable mechanical fasteners and an inner elongated recess 102.

FIG. 8 discloses a frame member 106 which is similar in construction to the outside corner framing member disclosed in U.S. Pat. No. 4,984,400, except that framing member 106 defines elongated recesses 108, 110 and 112.

I claim:

1. Support apparatus including a framing member for supporting adjacent wall panels of a wall assembly having outer surfaces and for supporting a structural member projecting outwardly from said framing member and from the outer surfaces of said adjacent wall panels, said framing member comprising, in combination:

an elongated body having a front body panel having a planar outer front body panel surface and a pair of elongated legs opposed to one another and having elongated distal ends spaced from said front body panel, curved back toward said front body panel, and defining an elongated channel; and a pair of elongated wall panel support flanges integrally connected to said elongated body, contiguous with said front body panel and extending from opposite sides of said front body panel along substantially the full length of said elongated body, said elongated wall panel support flanges each having a planar outer flange surface and a planar inner flange surface, said planar inner flange surfaces being co-planar and for engaging and being in partial registry with the outer surfaces of adjacent wall panels, said planar outer flange surfaces being co-planar with one another and with the planar outer front body panel surface, said elongated body defining an elongated opening in said planar outer front body panel surface between said elongated wall panel support flanges and spaced from said elongated wall panel support flanges and further defining an elongated recess in at least partial registry with said elongated opening and communicating with said elongated opening, said elongated recess being defined by spaced, elongated recess side walls formed by said elongated body and extending inwardly into said elongated body from said elongated opening and said planar outer front body panel surface away from said front body panel, said elongated recess including a first, relatively restricted, elongated recess portion adjoining said elongated opening and a second, larger, elongated recess portion spaced from said first, relatively restricted, elongated recess portion, said first, relatively restricted, elongated recess portion providing communication between said elongated opening and said second, larger, elongated recess portion, said second, larger, elongated recess portion being at least partially defined by a mechanical fastener engagement surface, said elongated opening and said elongated recess extending along the length of said elongated body and for receiving and accommodating mechanical fasteners at any desired location along the length of said elongated body, whereby said structural member may be attached to said framing member at any desired preselected location along the length of said elongated body by at least one mechanical fastener engaging the mechanical fastener engagement surface and whereby said structural member may be secured in tight engagement with said planar outer front body panel surface and in close proximity to wall panel outer surfaces engaged with said planar inner flange surfaces by said at least one mechanical fastener, said elongated body defining a second elongated recess spaced from and in substantial alignment with said first elongated recess for receiving at least one mechanical fastener, said second elongated recess being located between said leg distal ends and said elongated wall panel support flanges closely adjacent to said first elongated recess and opening to said channel defined by said pair of elongated legs and said front body panel and defined by spaced, elongated recess side walls extending inwardly from said channel into said elongated body and spaced a substantial distance inwardly of said elongated legs.

* * * * *